A. R. BALLARD.
MIRROR.
APPLICATION FILED DEC. 22, 1913.
1,121,785.
Patented Dec. 22, 1914.
2 SHEETS—SHEET 1.
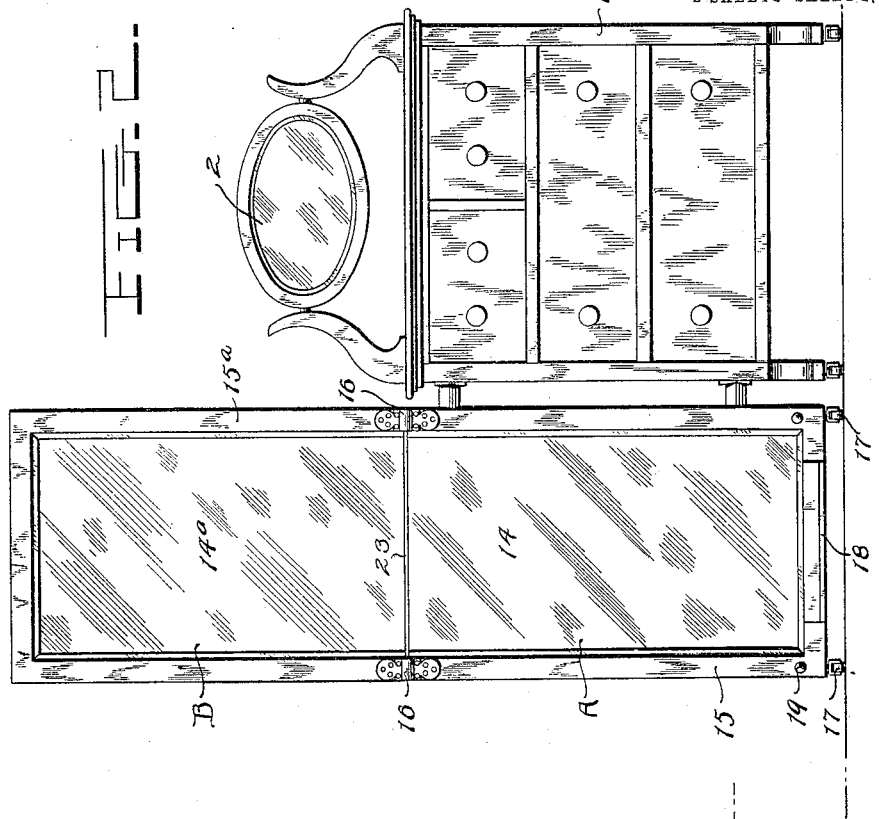
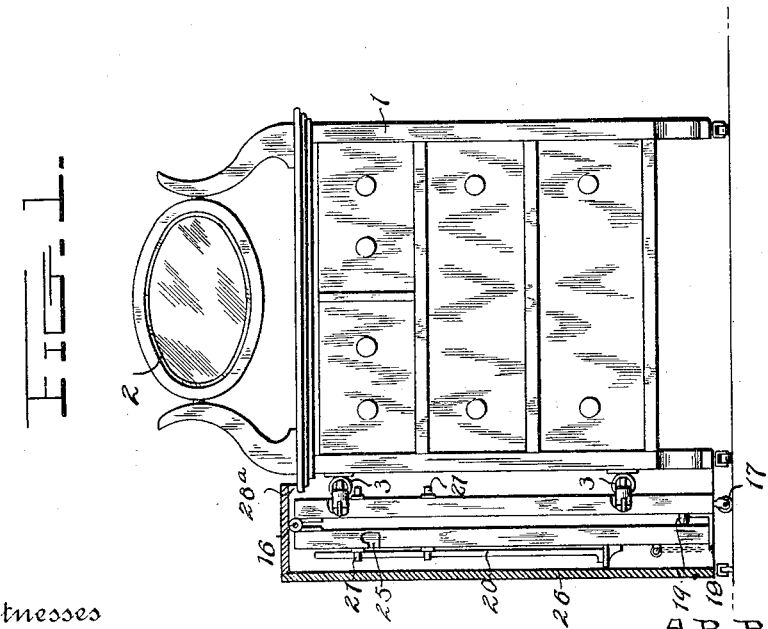
Witnesses
Harry B. Rook
Harriet B. Cornwall
Inventor
A. R. Ballard
By N. S. Hie
Attorneys

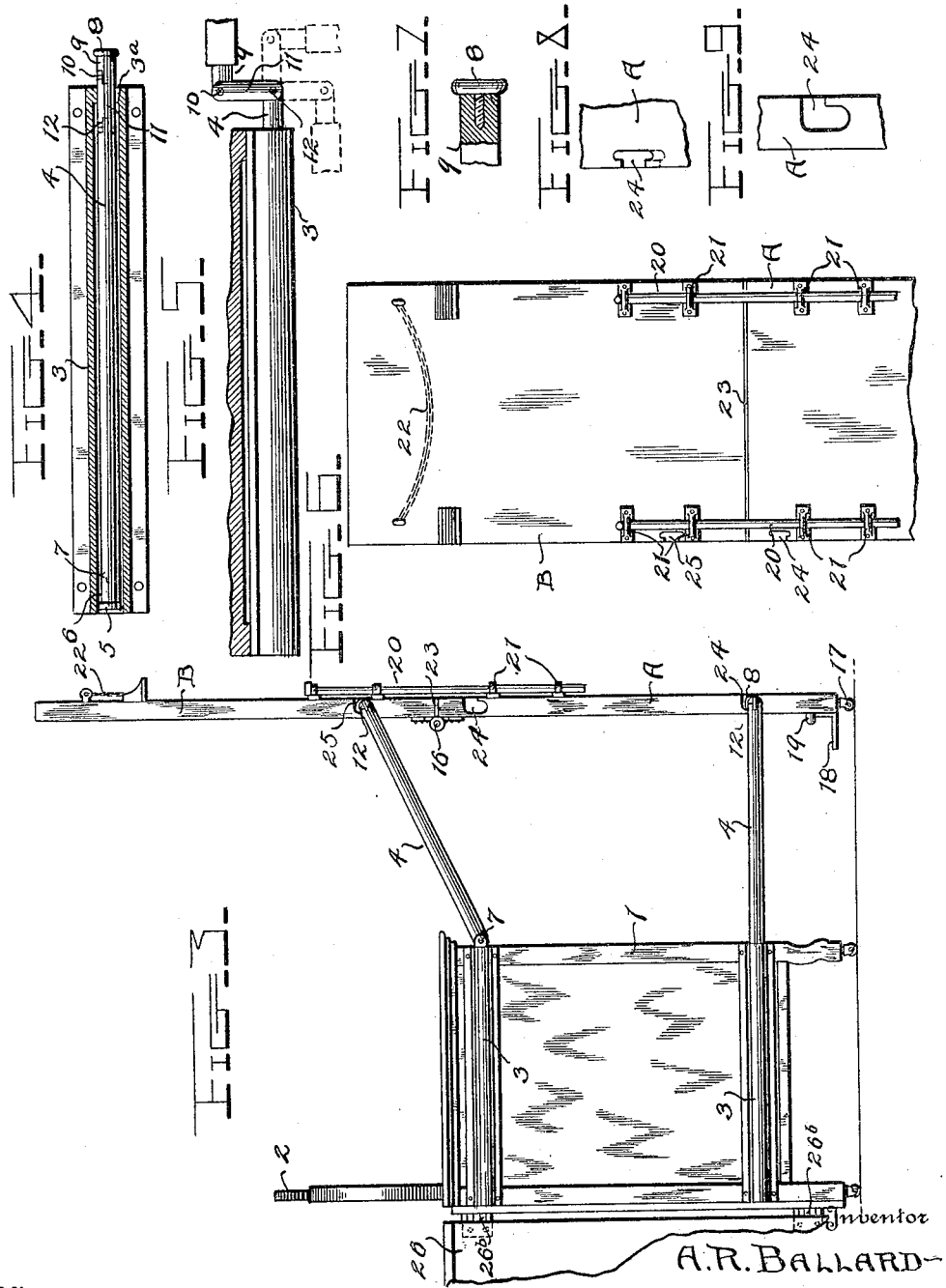

UNITED STATES PATENT OFFICE.

ALFRED R. BALLARD, OF SAN FRANCISCO, CALIFORNIA.

MIRROR.

1,121,785.  Specification of Letters Patent.  Patented Dec. 22, 1914.

Application filed December 22, 1913. Serial No. 808,202.

*To all whom it may concern:*

Be it known that I, ALFRED R. BALLARD, citizen of the United States, residing at San Francisco, in the county of San Francisco and State of California, have invented certain new and useful Improvements in Mirrors, of which the following is a specification.

The present invention relates to a mirror attachment for furniture, and has for its primary object to provide a device of this character which can be advantageously utilized in connection with a dressing table or the like, and which embodies a novel construction of mirror and manner of mounting the same whereby the device may be utilized independently as a floor mirror or brought into coöperative relation with the mirror of the dressing table so as to give both a front and rear view at the same time.

A further object of the invention is to provide a mirror attachment of this character for furniture, which is simple and inexpensive in its construction, which can be readily moved into and out of operative position, and which can be collapsed when not in use so as to be inconspicuous and occupy but a small amount of space.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a front elevation of a dresser provided with the mirror, the mirror being shown as collapsed. Fig. 2 is a similar view with the mirror inverted and swung around into position at one side of the dresser. Fig. 3 is an end view, showing the mirror as pulled outwardly and swung around in front of the dresser so as to have an opposed relation to the mirror thereof. Fig. 4 is an enlarged sectional view through one of the guide tubes within which the slides are mounted. Fig. 5 is a plan view of the same. Fig. 6 is a rear view of the mirror, the lower portion thereof being broken away, and Figs. 7, 8 and 9 are detail views of the detachable connection between the mirror and the outer ends of the slides.

Corresponding and like parts are referred to in the following description and indicated in all the views of the drawings by the same reference characters.

Specifically describing the present embodiment of the invention, the numeral 1 designates an article of furniture which may be of any conventional construction and is provided at the top thereof with the usual mirror 2. Mounted upon one side of the article of furniture 1, at the top and bottom thereof, are the horizontally disposed guide tubes 3. A slide 4 is mounted within each of the guide tubes 3 so as to have a telescoping action therein and project outwardly beyond the article of furniture 1 when withdrawn. The rear end of each of the slides 4 is provided with a head 5, the said head having a stem 6 which is pivotally connected to the slide at 7. These heads 5 are designed to engage shoulders $3^a$ formed by contractions at the forward ends of the guide tubes 3 for the purpose of limiting the outward telescoping movement of the slides and prevent the same from being entirely withdrawn from the guide tubes. The forward end of each of the slides 4 is also provided with a head 8, the said head being formed with a stem 9 which is pivotally connected at 10 to a link 11, the link being in turn pivotally connected at 12 to the slide. The axes of the two pivots 10 and 12 are substantially parallel to each other so as to provide a pair of joints which admit of the head 8 being turned in both directions.

The mirror attachment includes a lower mirror section A and an upper mirror section B which is mounted to be collapsed against the said lower mirror section. The lower mirror section A is formed with a mirrored glass 14 mounted within a frame 15, and in a similar manner the upper mirror section B is formed with a mirrored glass $14^a$ mounted within a frame $15^a$. It will be observed that the glass 14 extends entirely to the top of the lower frame 15, while the glass $14^a$ extends entirely to the bottom of the upper frame $15^a$, so that when the two sections are in operative position a practically continuous sheet of mirrored glass is exposed.

Suitable hinge members 16 connect the upper frame $15^a$ to the lower frame 15, the said hinge members being disposed at the front of the device so that the mirrored glass faces of the two sections fold against each other when the device is collapsed. The lower frame 15 is provided at the bottom thereof with suitable caster members 17 to admit of the mirror being freely moved and adjusted, and also with a forwardly projecting ledge or shelf 18 upon which the upper mirror section A rests when collapsed. Suitable rubber buffers 19 may also be applied to the frame 15 of the lower mirror section to hold the two mirror sections slightly spaced and thereby prevent scratching or marring of the same when the upper mirror section is lowered into inoperative position.

The back of the upper mirror section B is provided with a pair of locking bolts 20 which can be moved into engagement with keepers 21 upon the back of the lower mirror section A for the purpose of locking the upper mirror section in a raised position. It will also be observed that a chain 22 is applied to the back of the upper mirror section B at the top thereof, the said chain providing a handle which can be grasped when swinging the said mirror section into and out of operative position. When the locking bolts 20 are withdrawn from the keepers 21, the upper mirror section B can be folded downwardly against the lower mirror section A so as to collapse the device, although when the locking bolts 20 are in operative position, the upper mirror section B is maintained in an elevated position and in substantial alinement with the lower mirror section A so that the two sheets of mirrored glass form in effect a continuous mirrored surface. A thin strip of rubber 23 or similar material is applied to the upper edge of the lower mirror section A so as to be interposed between the two sheets of glass 14 and 14ª and eliminate any possibility of the adjacent edges of the pieces of glass being chipped or cracked by contact with each other as the upper mirror section B is swung into and out of operative position.

The lower mirrored section A preferably has substantially the same height as that of the article of furniture 1, and at one of its vertical edges is provided with a pair of substantially L shaped undercut slots 24 adapted to be detachably engaged by the heads 8 at the forward ends of the slides 4. It will also be observed that the corresponding vertical edge of the upper mirrored section B is provided with a similar L shaped undercut slot 25. When the mirror attachment is not in use, the upper mirror section B is folded downwardly against the lower mirror section A, the slides 4 completely telescoped within the guide tubes 3, and the device folded rearwardly against one end of the article of furniture 1. When in this position a suitable cover or casing 26 may be applied to the same, said cover being hinged to the article of furniture. When it is desired to use the mirror attachment, the cover 26 is swung around into an out of the way position, the mirrors swung outwardly into a position at substantially right angles to the end of the article of furniture 1, as indicated by Fig. 2. The upper mirror section B may then be swung into position. When thus adjusted the mirror can be utilized for giving a full length view of the figure, and it can be swung into any desired angle to the article of furniture 1, as may be found most convenient.

When it is desired to position the mirror attachment opposite the mirror 2 of the article of furniture 1, the slides 4 are drawn outwardly until the inner heads 5 engage the shoulders 3ª of the guide tubes 3, and the head 8 of the upper slide 4 disengaged from the upper L shaped slot 24 of the lower mirror section A, and brought into engagement with the L shaped slot 25 of the upper mirror section B. This provides a firmer brace for the mirror attachment, and owing to the before mentioned double joints between the heads 8 and the forward ends of the slides 4, the mirror sections A and B can be swung in front of the article of furniture 1 so as to have an opposed relation to the mirror 2. A person in front of the article of furniture 1 can now obtain both a front and rear view without the necessity of resorting to the use of a small hand mirror.

If desired, the guide tubes 3 may be constructed so as to be readily attached to any article of furniture, thereby enabling the entire attachment to be readily placed in position or removed therefrom, as may be desired.

The cover 26 may be in the form of a three sided casing which is hinged to a wing 26ª projecting laterally from the back of the article of furniture 1 at the rear of the mirror. The three sided casing 26, including a top, front, and side, is hinged at 26ᵇ to the outer edge of the wing 26ª, and is provided at its forward corner with a caster 26ᶜ which admits of the cover or casing being readily swung laterally into and out of operative position.

Suitable clips may be screwed into the frames for overlapping the edges of the sheets of glass so as to hold the glass firmly in position within the frame and prevent the glass from slipping out of position.

Having thus described the invention, what I claim as new and desire to secure by Letters Patent, is:—

1. A mirror attachment for furniture, including guide tubes adapted to be applied to an article of furniture, slides mounted within the guide tubes, heads at the outer ends of the slides, loose joints between the heads and the slides, an upright mirror including upper and lower hinged sections, the upper section being adapted to be folded downwardly against the lower section, means for detachably connecting the heads to the lower mirror section, means for detachably connecting one of the heads to the upper mirror section, means for locking the upper mirror section in a raised position, and a caster support for the lower mirror section.

2. A mirror attachment for furniture, including guide tubes adapted to be applied to an article of furniture and having shoulders at the forward ends thereof, slides mounted within the guide tubes, heads pivotally connected to the rear ends of the slides and adapted to engage the before mentioned shoulders to prevent withdrawal of the slides from the tubes, a second set of heads at the outer ends of the slides, loose joints between the second set of heads and the outer ends of the slides, an upright mirror including upper and lower hinged sections, means for detachably connecting the second set of heads to the lower mirror section, and means for detachably connecting one of the said heads to the upper mirror section.

3. A mirror attachment for furniture including guide members adapted to be applied to an article of furniture, slides mounted within the guide members, heads at the outer ends of the slides, loose joints between the heads and the slides, an upright mirror including upper and lower hinged sections, the upper mirror section being adapted to be collapsed against the lower mirror section, means for locking the upper mirror section in a raised position, the lower mirror section being provided in one side thereof with means for detachably engaging the before mentioned heads and the upper mirror section being also provided with means for detachably engaging one of the said heads, the two heads both engaging the lower mirror section when the device is folded and one head engaging the lower mirror section while the upper head engages the other mirror section when the device is open for use, and a caster support for the lower mirror section.

In testimony whereof I affix my signature in presence of two witnesses.

ALFRED R. BALLARD.

Witnesses:
W. H. CLAY,
L. H. ANDERSON.

Copies of this patent may be obtained for five cents each, by addressing the "Commissioner of Patents, Washington, D. C."